Patented Oct. 16, 1934

1,976,921

UNITED STATES PATENT OFFICE 1,976,921

DIALKYL-AMINO-ALKYL-ESTERS OF DIALKYL-AMINO-ALKOXY-3-CARBOXY-DIPHENYL

Walter G. Christiansen and William Braker, Brooklyn, N. Y., assignors to E. R. Squibb & Sons, Brooklyn, N. Y., a corporation of New York No Drawing. Application June 1, 1932, Serial No. 614,839

18 Claims. (Cl. 167—52)

This invention relates to dialkyl-amino-alkyl esters of dialkyl-amino-alkoxy-derivatives of 3-carboxy-diphenyl and particularly those derivatives in which the substituted alkoxy group is ortho to the carboxy group. The invention also includes the salts of these compounds. It relates more particularly to 3-β-diethyl-amino-carbethoxy-4-β-diethyl-amino-ethoxy-diphenyl and 3-γ-di-n-butyl-amino-carbopropoxy-4-γ-di-n-butyl-amino-propoxy-diphenyl, and hydrochlorides and borates thereof. It includes the new compounds and anesthetics containing these compounds.

These new compounds are advantageously prepared from an hydroxy-3-carboxy-diphenyl by forming its di-sodium derivative, and then replacing the sodium atoms by dialkyl-amino-alkyl radicals. Various steps in the reaction are indicated by the following equation where R and $R_1$ are polymethylene groups and $R_2$, $R_3$, $R_4$, and $R_5$ are the same or different alkyl radicals:

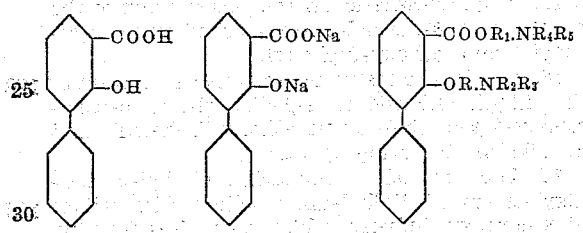

The preparation of 3-β-diethyl-amino-carbethoxy-4-β-diethyl-amino-ethoxy-diphenyl and 3-γ-di-n-butyl-amino-carbopropoxy-4-γ-di-n-butyl-amino-propoxy-diphenyl is given herewith to illustrate the preparation of the compounds of this invention, although it is to be understood that the invention is not limited thereto. In preparing these two compounds we have found it advantageous to start with 3-carboxy-4-hydroxy-diphenyl prepared by the method disclosed in the application of Adelbert W. Harvey, Serial No. 615,473, filed June 4, 1932, as follows:

170 grams of 4-hydroxy-diphenyl is converted into the sodium phenolate by heating to boiling with 40 grams of sodium hydroxide in 400-600 cc. of solution. The sodium phenolate may be recovered by direct evaporation over a free flame or by any other suitable method of evaporation. Care should be taken to prevent the solution of the incompletely dried mixture from absorbing carbon dioxide. Final drying of the phenolate is carried out in vacuo, about 10 mm., at 180° C. for some time, usually five hours, after no more water is collected in an ice trap.

The dry pulverized phenolate is treated with carbon dioxide in an autoclave at approximately 90 pounds per square inch to form the sodium salt of 3-carboxy-4-hydroxy-dephenyl. The temperature is held at 110-120° C. for one hour, increased to 160-170° C., and held at the latter temperatures for 3-4 hours. The reaction product is placed in 3000-4000 cc. of water, heated to boiling, then, preferably after filtering, treated with carbon dioxide until no more 4-hydroxy-diphenyl is precipitated. The suspension is filtered to remove the unconverted 4-hydroxy-diphenyl and the 3-carboxy-4-hydroxy-diphenyl is precipitated by acidification with mineral acid. The product is then filtered off, washed with water and dried.

*Example 1.*—2.9 grams of 3-carboxy-4-hydroxy-diphenyl were dissolved in alcohol and an alcoholic solution containing 0.624 gram sodium added. The disodium salt of 3-carboxy-4-hydroxy-diphenyl which separated out was filtered, washed with ether and dried in vacuo.

3.5 grams of the above prepared disodium salt of 3-carboxy-4-hydroxy-diphenyl were refluxed with 7.2 grams of β-diethyl-amino-ethyl-chloride in an oil bath kept at 170-180° for six hours. At the end of the time excess β-diethyl-amino-ethyl-chloride was distilled off at 40 mm. on the steam bath. The residue was extracted with ether and the latter solution dried over $Na_2SO_4$.

The dihydrochloride of this compound may be formed by dissolving 1.5 grams of the base in ether and passing dry hydrochloric acid gas through the solution. The dihydrochloride separates out from solution as an oil which upon driving off the excess hydrochloric acid becomes a yellowish white solid.

A borate may be formed by dissolving one mole of the base in 4.0 cc. of acetone, heating the solution to boiling and then adding it to a boiling solution of five molecules of boric acid in 125 cc. of acetone. On evaporating the solvent a light yellow oil is obtained which crystallizes to a yellowish white solid. Or a borate may be formed by dissolving the base in aqueous boric acid containing, for example, 4 molecules of boric acid, and then evaporating to dryness.

Solutions of both the hydrochloride and borate have been successfully used as local anesthetics. A solution of the borate in water has a higher pH value than a solution of the hydrochloride and it is therefore preferred. By buffering a 2% solution of the hydrochloride with phosphate, etc. a satisfactory local anesthetic can be obtained.

*Example 2.*—2.0 grams of 3-carboxy-4-hydroxy-diphenyl were dissolved in alcohol and an alcoholic solution containing 0.43 gram sodium added. The disodium salt of 3-carboxy-4-hydroxy-diphenyl which separated out was filtered, washed with ether and dried in vacuo.

2.34 grams of the above prepared disodium salt of 3-carboxy-4-hydroxy-diphenyl were refluxed with a solution consisting of 4.5 grams of di-n-butyl-amino-propyl chloride dissolved in 15.0 cc. of dry xylene. After refluxing for eight hours, xylene and excess di-n-butyl-amino-propyl chloride were distilled off at 40 mm. on the steam bath. The residue was washed with water several times by decantation to remove sodium chloride. This residue was 3-γ-di-n-butyl-amino-carbopropoxy-4-γ-di-n-butyl-amino-propoxy-diphenyl.

The dihydrochloride of this compound may be formed by dissolving 2.5 grams of the base in alcohol and passing dry hydrochloric acid gas through the solution. Evaporation of the alcohol yielded the viscous semi-solid dihydrochloride of 3-γ-di-n-butyl-amino-carbopropoxy-4-γ-di-n-butyl-amino-propoxy-diphenyl.

By treating the disodium salt of 3-carboxy-4-hydroxy-diphenyl with other alkyl-amino-alkyl-chlorides, other derivatives may be formed. For example, the methyl-ethyl-amino or other alkyl-amino compounds may be formed by treating the disodium derivative with methyl-ethyl-amino-alkyl-chloride or propyl-amino-alkyl-chloride, etc. Dialkyl-amino-derivatives of normal or secondary chlorides may be employed to form compounds with either straight or branched side chains. By careful selection of the alkyl-chloride with which the sodium atoms of the disodium derivative of 3-carboxy-4-hydroxy-diphenyl is treated a variety of end products may be obtained. Corresponding derivatives of 3-carboxy-2-hydroxy-diphenyl may be similarly prepared.

We claim:

1. A compound of the group consisting of the dialkyl-amino-alkyl-esters of dialkyl-amino-alkoxy derivatives of 3-carboxy-diphenyl and inorganic salts thereof.

2. A compound of the group consisting of the dialkyl-amino-alkyl-esters of 3-carboxy-diphenyl which contain a dialkyl-amino-alkoxy-group ortho to the carboxy-group and inorganic salts thereof.

3. As compounds, alkoxy-esters having the general formula:

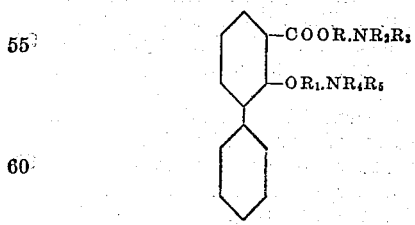

where R and R₁ are methylene or polymethylene groups and R₂, R₃, R₄ and R₅ are alkyl radicals.

4. As compounds, inorganic salts of the compounds of claim 3.

5. As compounds alkoxy-esters having the general formula:

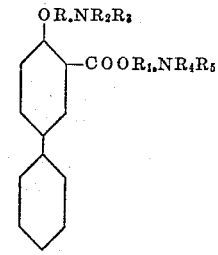

where R and R₁ are methylene or polymethylene groups and R₂, R₃, R₄ and R₅ are alkyl radicals.

6. As compounds, inorganic salts of the compounds of claim 5.

7. As a compound, 3-β-diethyl-amino-carbethoxy-4-β-diethyl-amino-ethoxy-diphenyl.

8. As a compound, the dihydrochloride of the compound of claim 7.

9. As a compound, a borate of 3-β-diethyl-amino-carbethoxy-4-β-diethyl-amino-ethoxy-diphenyl.

10. As compounds, inorganic salts of 3-β-diethyl-amino-carbethoxy-4-β-diethyl-amino-ethoxy-diphenyl.

11. As a compound, 3-γ-di-n-butyl-amino carbopropoxy-4-γ-di-n-butyl-amino-propoxy-diphenyl.

12. As compounds, inorganic salts of the compound of claim 11.

13. As a compound, the dihydrochloride of the compound of claim 11.

14. As an anesthetic, a solution of a dialkyl-amino-alkyl-ester of a dialkyl-amino-alkoxy derivative of 3-carboxy-diphenyl.

15. As an anesthetic, an aqueous solution of the borate of 3-β-diethyl-amino-carbethoxy-4-β-diethyl-amino-ethoxy-diphenyl.

16. As a local anesthetic, an aqueous solution of the dihydrochloride of 3-β-diethyl-amino-carbethoxy-4-β-diethyl-amino-ethoxy-diphenyl and an alkaline buffering agent.

17. The method of preparing dialkyl-amino-alkyl-esters of dialkyl-amino-alkoxy derivatives of 3-carboxy-diphenyl which comprises forming the disodium salt of a hydroxy-3-carboxy-diphenyl and then replacing each sodium atom of the sodium salt with a dialkyl-amino-alkylene group.

18. The method of preparing dialkyl-amino-alkyl-esters of derivatives of 3-carboxy-diphenyl containing a dialkyl-amino-alkoxy group ortho to the carboxy radical which comprises forming the disodium salt and then replacing each atom of sodium by reaction with a dialkyl-amino-alkyl chloride.

WALTER G. CHRISTIANSEN.
WILLIAM BRAKER.